United States Patent Office 3,682,588
Patented Aug. 8, 1972

---

3,682,588
PHOSPHATE PARTICLES
Robert J. Fuchs, Clark, and Raimond Pals, Farmingdale, N.J., assignors to FMC Corporation, New York, N.Y.
No Drawing. Continuation-in-part of application Ser. No. 743,279, July 9, 1968. This application July 21, 1970, Ser. No. 56,973
Int. Cl. C01b 25/30
U.S. Cl. 423—315
17 Claims

ABSTRACT OF THE DISCLOSURE

Particles of condensed phosphates of controlled density (either high or low) are produced by passing a dry, finely powdered sodium orthophosphate through a flame or other high temperature radiant heat zone. Solid or hollow beads, of controlled size much larger than that of the feed particles are formed.

---

This application is a continuation-in-part of our application Ser. No. 743,279 filed July 9, 1968, and now abandoned.

This invention relates to a novel process for the production of particles of condensed phosphates of controlled density.

The production of condensed phosphates, such as pentasodium tripolyphosphate, from orthophosphates by molecular dehydration is well known in the art. Among the methods taught in the patent literature are rotary calcining of finely powdered sodium orthophosphate to form agglomerated particles of the tripolyphosphate having a popcorn-like appearance under the microscope; spraying of droplets of an aqueous solution of an orthophosphate into a heated zone to produce the tripolyphosphate in the form of hollow beads, with a considerable proportion of fines; and heat-treating powdered orthophosphate in a fluidized bed.

In accordance with one aspect of this invention dispersed particles of a dry finely powdered sodium orthophosphate are passed through a high temperature radiant heat zone, such as a flame (e.g. of burning methane). We have found, surprisingly, that not only does molecular dehydration of the salt take place, producing condensed phosphates, but that the process yields products whose particle size and mass are much larger than that of the feed material. Furthermore the process yields particles of condensed phosphate of two types, each of which is itself of relatively uniform particle size and from which fines are substantially absent.

More particularly, we have produced particles of two general configurations. These are (a) hollow beads of low density (e.g. of bulk density generally less than 0.7 g./cc.) and (b) smaller more dense beads, of bulk density about 1 g./cc. and higher, and of generally spherical or spheroidal shape. Both types of particles can be produced in a single process, and separation of the two types can be effected simply by a single screening of the product. The type and proportion of the particles can be controlled by control of such conditions of the process as the particle size of the powdered feed, the retention time in the radiant heat zone and the degree of dispersion of the particles while passing through that zone.

The treatment in the high temperature radiant heat zone has been found to produce glassy beads (of either the hollow low density or solid high density type) which are largely or entirely amorphous. These may be calcined to effect a further molecular dehydration or crystallization so as to produce non-glassy crystalline beads, of the same size and shape as the original beads, of more highly condensed phosphates.

For the production of beads the Na:P atomic ratio in the feed material is less than 2:1, preferably in the range of about 1:1 to 1.7:1. As the Na:P ratio decreases the pH of aqueous solutions of the products decreases and the products are therefore especially suitable for sequestering purposes in solutions where low pH is desirable (e.g. in acid cleaners and sanitizers used for dairy equipment, metal cleaners, etc.)

The high temperature radiant heat zone should be at a temperature of at least about 700° C., preferably above 1000° C.

The residence time in the high temperature radiant heat zone is generally relatively short (preferably well below 5 seconds). Residence times as low as 0.01 second have been used with considerable success. One practical range of residence (retention) times is on the order of about 0.01 to 1 second.

While the reasons for the effects we have observed are not understood, and we do not wish to be bound or limited by any explanation, we believe that they may be explained, in part, as follows. The small particles, which are initially at a temperature well below 150° C. (e.g. at 25 or 50° C.) are heated extremely rapidly in the radiant heat zone (e.g. at a rate of over 100° C. per decisecond). This heating splits out water from the dry powder by molecular dehydration. Due to the rapidity of the heating at least some of the water is retained in the particle for a short time and lowers the fusing temperature of the powder so that at a temperature within the range of say 150° C. to 300° C. (e.g. 250° C.) the particles will be in a condition in which they adhere together despite the very short period of exposure to the high temperature. Evolution of water in gaseous form from coalesced or agglomerated fused particles thus formed may produce the hollow beads. We believe that the particles in the flame generally attain a maximum temperature which is considerably below the flame temperature (which may be, for example, 1200° C.) owing to the fact that the dehydration reaction, melting and evolution of water all require the input of heat and tend therefore to keep the particles cool. Analysis of some particles produced by our process indicates the presence of no sodium trimetaphosphate and little or no sodium tripolyphosphate therein (these particles had been passed through a flame one, two or three times, the retention time per pass being on the order of $\frac{1}{20}$ second); this leads us to believe that the particles generally attain a maximum temperature which is below about 500° C. and probably below about 300° C.

The fusing of the particles indicates that the maximum temperature they attain is probably well above 150° C. As the particles leave the flame they generally cool quite rapidly and when collected are in a non-tacky state.

The proportions of the type of particle produced (i.e. solid or hollow) can be changed by varying the degree of dispersion of the cloud of feed particles introduced into the radiant heat zone. This can be accomplished most easily by simple experimentation, e.g. by feeding different numbers of particles per cubic foot of feed stream to a particular radiant heat zone and observing the results.

The feed material is, as previously stated, in the form of fine particles, preferably of particle size such as to pass through a 50 mesh screen (U.S. Standard, corresponding to a particle diameter of less than about 0.3 mm.) and more preferably of particle size such as to pass through a 100 mesh screen (U.S. Standard corresponding to a particle diameter of less than about 0.15 mm.). In the process fine feed particles are converted to particles of considerably larger mass, e.g. to more than twice the original mass per particle.

Calcination of the beads to produce more highly condensed phosphates may be effected by heating at a temperature in the range, for example, of 250°–550° C., by heating in a rotary klin, or a fluidized bed, or by dropping the material through a heated tower. The type of product produced by the calcination will depend in large measure on the Na:P ratio in the starting material. Thus if one starts with an Na:P atomic ratio of about 5:3 (i.e. about 1.67:1), (e.g. by using an orthophosphate which is an equimolar mixture of crystalline disodium phosphate and a crystalline double salt of monosodium phosphate and disodium phosphate) the principal product of full calcination will be a pentasodium tripolyphosphate. At an Na:P atomic ratio of 1:1 metaphosphates can be obtained, e.g. sodium trimetaphosphate (at calcination temperatures of say 450–500° C.) and, depending on calcination conditions, insoluble sodium metaphosphate. At intermediate Na:P atomic ratios (e.g. 1.1:1 or 1.2:1 or the 1.5:1 ratio obtained by using the crystalline double salt of monosodium phosphate and disodium phosphate) one can obtain mixtures of sodium trimetaphosphate and pentasodium tripolyphosphate by calcination.

It is within the broader aspects of the invention to use a flame or other high temperature radiant heat zone to carry out practically the entire calcination; in this case, the retention time in the high temperature radiant heat zone will be increased. It is also within the broad scope of the invention to use a bead forming and calcining process in which the retention time, per pass in the radiant heat zone is short, the glassy beads of partially condensed phosphate are recycled together with feed of orthophosphate particles to that same zone, and the beads are kept at a calcining temperature between passes through that zone.

The process of this invention makes it possible to obtain an extremely high yield of the phosphate in granular form (e.g. 90–100% yield of granular pentasodium tripolyphosphate). Furthermore, it is unique in its ability to produce products covering such a wide range of bulk density, and products of such uniform spheroidal structure which are exceptionally free-flowing and non-dusty compared to previous known products. The uniform particle size minimizes variations in dissolving rate, hydration, uniformity of blending with other ingredients, and other important use properties. The spheroids are of course not perfect spheres; under the microscope they often appear to be shaped somewhat like round potatoes. The process has produced hollow beads which have thicker walls, are more uniform, and have less openings into the centers of the beads, when compared to hollow beads made by spray drying. The solid beads have exceptionally low friability.

The following examples are given to illustrate this invention further. In the examples, as in the rest of the application, all proportions are by weight unless otherwise indicated. Also in the examples all pressures are atmospheric unless otherwise indicated.

EXAMPLE 1

Sodium phosphate solutions having molar ratios of Na/P ranging from 1.0/1 to 2.0/1 were prepared by mixing appropriate proportions of soda ash, phosphoric acid and water. Corresponding potassium phosphate solutions were prepared from potassium hydroxide, phosphoric acid and water. Each solution was evaporated to dryness and the dry orthophosphate was ground to a crystalline powder, all of which passed through a 100-mesh sieve (U.S. Standard).

A portion of each dry powdered orthophosphate was fed from a Syntron vibratory feeder and allowed to fall in dispersed powder form into a bank of three horizontal gas flames (from three laboratory Meker burners mounted, horizontally, one directly above the other). Each flame was about 1½ inch in diameter (and about 4 inches long). A rough test shows that the velocity of free fall of the powder in air is about 2.5 feet per second; on this basis the average retention time in the bank of three 1½ inch flames was on the order of 0.1 to 0.2 second (about 1/20 second per flame).

The products were examined for physical form (bead formation) and analyzed for pH and for calcium sequestering value.

Results are given in the following table:

| Atomic ratio in the dry orthophosphate | Properties of heat-treated product | | |
|---|---|---|---|
| | Physical form | pH | G. calcium sequester per 100 g. product |
| Na/P=1.00/1 | Beads | 4.6 | 7.0 |
| Na/P=1.50/1 | do | 7.0 | 4.6 |
| Na/P=1.67/1 | do | 8.9 | 6.4 |
| Na/P=2.00/1 | No beads | 9.8 | 0.6 |
| K/P=1.00/1 | do | 4.5 | 1.2 |
| K/P=1.67/1 | do | 8.5 | 0.7 |
| K/P=2.00/1 | do | 9.5 | 0.2 |

For comparison tetrasodium pyrophosphate has a calcium sequestering value of 4.5 g. Ca sequestering per 100 g. product.

The calcium sequestering value was determined by the method described by Hafford, Leonard, and Cummins, Industrial & Eng. Chem., Analytical edition, vol. 18, pg. 411, 1946, but with 0.1 g. of sodium oxalate added to each solution to improve the end-point turbidity.

EXAMPLE 2

Phosphoric acid, soda ash, and water were reacted in sufficient quantity to give a sodium phosphate solution having a molar ratio of Na/P of 1.67/1 and a density of 53° Baumé at 100° C. The solution was evaporated to dryness in a rotary dryer and the dry orthophosphate was cooled and ground. The powdered product ("ortho powder") contained 85% by weight of particles smaller than 200-mesh with the remaining 15% ranging up to 30-mesh (U.S. Standard sieves).

A portion of this ortho powder was fed from a Syntron vibratory feeder and allowed to call, as a shower, in dispersed powder form through a horizontal gas flame (about 2 feet long) of 3-inch diameter; on the basis discussed in Example 1, the retention time in this flame was about 0.1 second. The product had an ignition loss at 500° C. of 2.2% for comparison, the ignition losses at 500° C. for the ortho powder and for pure STPP (pentasodium tripolyphosphate) are 9% and 0% respectively. The product consisted almost entirely of amorphous condensed phosphates in the form of small spheres; the amorphous character of the product was determined by X-ray examination. The product was separated into two fractions by screening through a U.S. No. 50 sieve. The +50 mesh fraction amounted to 65% of the total and consisted of uniformly sized hollow beads having a bulk density of 0.53 g./cc. The −50 mesh fraction consisted of uniformly sized solid glassy-looking beads having a bulk density of 1.12 g./cc. When the two fractions were heated at 400° C. in a muffle furnace (a laboratory furnace of the conventional insulated electrically heated type, in which the particles were maintained as a stationary bed) for 15 minutes they were converted to STPP without adhering together and without any noticeable change in size, shape or bulk density, but became opaque and white rather than glassy in appearance. X-ray diffraction analysis showed that the calcined products were mainly crystalline STPP.

EXAMPLE 3

A portion of the dry ortho powder from Example 2 was fed by gravity from a Syntron feeder through a vertical electric tube furnace 2-inches in diameter by 2-ft. high. The retention time of the powder in the radiant heat zone was about 0.8 second; to keep the particles falling through the furnace, mild suction was applied at the base of the furnace, overcoming the "chimney effect" of the hot air therein. A thermocouple at the center point of the furnace gave a reading of 750° C. the product collected at the bottom, which had an ignition loss (500° C.) of 3.4%, was mostly amorphous condensed phosphate, almost entirely in the form of hollow spheres having a bulk density of 0.41 g./cc. On further heating at 350° C. in a furnace the spheres were converted to white crystalline STPP without change in size, shape or bulk density.

EXAMPLE 4

Ortho powder prepared as described in Example 2 was separated into 5 screen fractions, and each fraction was dispersed through a horizontal flame of a Meker burner (the flame being about 1½ inch in diameter, as in Example 1). Separate portions of the same screened fractions were passed through a bank of several (e.g. 5) such horizontal flames, one directly above the other, increasing the estimated retention time to 0.25 second. The products

| Na:P atomic ratio in feed material | Flame treatment, number of— | | Crystallinity by X-ray diffraction,[a] percent | | | | Distribution of phosphate species,[b] percent | | | | |
|---|---|---|---|---|---|---|---|---|---|---|---|
| | Flames | Passes | Form I, STPP | Form II, STPP | TSPP [c] | Other | Ortho | Pyro | Tripoly | High poly [d] | Trimeta |
| 1:1 (−100 mesh) | 3 | 2 | 0 | 0 | 0 | 0 | 28 | 14 | 5 | 53 | 0 |
| 1.5:1 (−100 mesh) (double salt, as previously described) | 3 | 2 | 0 | 0 | 0 | 0 | 1 | 16 | 32 | 51 | 0 |
| 1.67:1 (−50+100 mesh) | 1 | 1 | 0 | 0 | 39 | 0 | 13 | 48 | 17 | 22 | 0 |
| | 2 | 1 | 0 | 0 | 30 | 0 | 10 | 54 | 12 | 24 | 0 |
| | 3 | 1 | 0 | 3 | 34 | 0 | 1 | 52 | 28 | 29 | 0 |

[a] Crystallinity was determined as described in Analytical Chemistry 25, 1814 (1953).
[b] Distribution of phosphate species was determined as in Analytical Chemistry 35, 769 (May 1963). In this analysis the crystalline and amorphous forms of the particular phosphate species (e.g. crystalline and amorphous tetrasodium pyrophosphate) are reported together.
[c] TSPP is an abbreviation for tetrasodium pyrophosphate.
[d] High-poly here includes all chain phosphate of chain length longer than 3 and any trimetaphosphate.

showed ignition loss values (500° C.) varying from 0.5 to 3.2%, indicating that the amount of dehydration was about 64 to 94% of that which would occur on complete conversion to STPP. The variation in retention time did not have much effect on product properties but the variation in particle size had a great effect on the distribution of low and high bulb density final product as shown in the following table:

| Screen size fraction of ortho feed | Percent low bulk density product (+50 mesh) | Percent high bulk density product (−50 mesh) |
|---|---|---|
| −30+50 | [1] | [1] |
| −50+70 | <10 | >90 |
| −70+100 | <10 | >90 |
| −100+200 | 10–30 | 70–90 |
| −200 | >90 | <10 |

[1] No beads.

Bulk densities of the +50 mesh products varied from 0.48 to 0.59 g./cc. and of the −50 mesh products, from 1.00 to 1.23 g./cc. When these flame-treated fractions were further heated at 300 to 450° C. in a furnace they were converted to STPP without substantial change in size or shape or bulk density.

EXAMPLE 5

An apparatus was set up in which the powdered orthophosphate could be fed through a T-tube into an air line supplying the air for a laboratory Meker air-gas burner so that the fluidized powder was airveyed (i.e. carried in the air stream) directly through the flame. The burner was held horizontally to give a horizontal flame about 1–1½ in diameter (and about 4 inches long). Ortho powder, prepared as in Example 2 and of particle size below 100 mesh, was fed into the air line in this manner; the retention time of the particles in the radiant heat zone (flame) was on the order of about 0.01 second. Essentially all of the material was converted into small uniform solid glassy beads which were converted into STPP upon further heating without any change in form or size. The bulk density of the product was 1.15 g./cc.

Similar results were obtained in similar tests in which the powder was airveyed in a separate air tube directed into the flame of the same type of burner; here a separate air stream, carrying the powder, moving in the same direction as the horizontal flame was directed at the base of the flame so that the powder travelled along with the flame.

EXAMPLE 6

A series of glassy beads formed by the flame treatment as described in this application was analyzed to determine the crystallinity and chemical nature of the material. The results are tabulated below. The flame, in each case, was as described in Example 1. In some cases more than one flame was used as shown in the tabulation; in such cases the flames were arranged as a vertical bank (as in Example 1). In some cases the powder was passed more than one through the bank of flames, as indicated under "passes" in the tabulation.

The bulk densities referred to herein are loose bulk densities. That is, the volumetric measurements used in determining these bulk densities are obtained on material poured into a measuring vessel, without tapping or shaking the vessel.

Flame temperatures for air-gas flames, e.g. as used in Example 1 above, are generally below 2200° C., (such as about 1700–2000° C.) although it is within the broader scope of the invention to use higher temperature flames e.g. acetylene-air flames or flames fed with oxygen instead of air, which may have temperatures up to about 3200° C. For the well known figures for flame temperatures see, for instance, Perry, Chemical Engineers' Handbook, published by McGraw-Hill Book Co., third edition, 1950, pages 1588–1589 and Flame Photometry by F. Burriel-Marti and J. Ramirez-Munoz published by Elsevier Publishing Co., 1957, page 38.

It is understood that the foregoing detailed description is merely given by way of illustration and that many variations may be made therein without departing from the spirit of the invention.

We claim:

1. Process for the production of glassy condensed phosphate beads by feeding dispersed particles of dry powdered sodium orthophosphate in which the Na:P atomic ratio is less than 2:1 through a radian heat zone having a temperature of at least 700° C. to convert said feed particles to glassy beads of larger particle mass than said feed particles, said feed particles being of a size such as to pass through a 50 mesh U.S. Standard screen and the temperature of said heating zone and the residence time of said orthophosphate feed particles in said heat zone being such that, in the conversion of said orthophosphate particles to said glassy beads, an incomplete chemical reaction of dehydration occurs the extent of said dehydration being that attainable by calcination at a temperature below about 500° C. and above about 150° C., said glassy beads being completely dehydratable by calcination at a temperature of 550° C.

2. Process as in claim 1 in which the orthophosphate feed is a dry crystalline powder and the particles emerging from said zone are glassy spheroidal beads having a particle mass at least twice that of the powdered feed particles.

3. Process as in claim 1 in which the Na:P atomic ratio in the orthophosphate feed is in the range of about 1:1 to 1.7:1.

4. Process as in claim 1 in which the retention time in said zone is less than five seconds.

5. Process as in claim 4 in which the retention time in said zone is less than 1 second.

6. Process as in claim 1 for the production of hollow pentasodium tripolyphosphate beads in which a cloud of particles of dry crystalline powder of less than 100 mesh (U.S. Standard) particle size of sodium orthophosphate of 5:3 Na:P atomic ratio is passed into a flame having a temperature of at least about 1000° C. whereby there are produced glassy spheroidal hollow beads of condensed phosphate having a bulk density less than 0.7 g./cc., and said glassy hollow beads are then calcined at a temperature in the range of about 250 to 550° C. to effect molecular dehydration and crystallization to convert said glassy hollow beads to crystalline hollow beads of pentasodium tripolyphosphate of substantially the same size, shape and bulk density as said glassy hollow beads.

7. Process as in claim 5 and including the further step of calcining said beads to effect molecular dehydration and crystallization of the phosphate.

8. Process for the production of glassy spheroidal beads by feeding dry crystalline powder of sodium orthophosphate in which the Na:P atomic ratio is in the range of about 1:1 to 1.7:1, said orthophosphate feed particles being of a size such as to pass through a 50 mesh U.S. standard screen, through a radiant heat zone having a temperature of at least 700° C. to convert said feed particles to glassy spheroidal beads having a particle mass at least twice that of the powdered feed particles, the temperature of said heat zone and the residence time of the particles in said heat zone being such that, in the conversion of said orthophosphate feed particles to said glassy spheroidal beads, said particles attain a temperature which is below about 500° C. and above 150° C.

9. Process as in claim 1 in which the temperature of the radiant heating zone is up to about 3200° C.

10. Process as in claim 1 in which the temperature in the radiant heat zone is below 2200° C.

11. Process as in claim 6 in which the retention time in said zone is less than one second and the temperature in said zone is below 2200° C.

12. Process as in claim 2 in which the particles emerging from said zone are a mixture of dense beads of bulk density at least about 1 g./cc. and larger hollow beads of lower bulk density, and including the step of separating said beads by size whereby to separate hollow beads from the more dense beads.

13. Process as in claim 2 in which the Na:P atomic ratio in the orthophosphate feed is in the range of about 1:1 to 1.7:1.

14. Process as in claim 2 in which the Na:P ratio in the orthophosphate feed is about 5:3 and said glassy spheroidal beads have an ignition loss at 500° C. of 0.5 to 3.4% in an ignition test in which the ignition loss for sodium orthophosphate of 1.67:1 Na:P ratio is 9% and the ignition loss for pentasodium tripolyphosphate is 0%.

15. Process as in claim 1 and including the further step of calcining said beads to effect molecular dehydration and crystallization of the phosphate.

16. Process as in claim 1 and including the further step of calcining said glassy beads at a temperature in the range of about 250 to 550° C. to effect molecular dehydration and crystallization to convert said glassy hollow beads to crystalline hollow beads of pentasodium tripolyphosphate of substantially the same size, shape and bulk density as said glassy hollow beads.

17. Process as in claim 13 in which orthophosphate feed particles having a particle size such as to pass through a 200 mesh U.S. standard screen are fed to said radiant heat zone whereby to form in said zone glassy hollow beads, of bulk density less than 0.7 g./cc. of said dehydratable condensed phosphate.

References Cited
UNITED STATES PATENTS

| | | | |
|---|---|---|---|
| 2,182,357 | 12/1939 | Schwartz | 23—106 A |
| 2,601,395 | 6/1952 | Hatch | 23—106 A X |
| 2,898,189 | 8/1959 | Rodis et al. | 23—107 |
| 3,081,150 | 3/1963 | Beltz et al. | 23—106 A |
| 3,438,725 | 4/1969 | Heymer et al. | 23—106 A |

OSCAR R. VERTIZ, Primary Examiner

C. B. RODMAN, Assistant Examiner

UNITED STATES PATENT OFFICE
CERTIFICATE OF CORRECTION

Patent No. 3,682,588              Dated August 8, 1972

Inventor(s) Robert J. Fuchs and Raimond Pals

It is certified that error appears in the above-identified patent and that said Letters Patent are hereby corrected as shown below:

Column 1, line 18, "particles" should read --particles,--.

Column 3, line 4, "klin" should read --kiln--.

Column 3, line 29, "pass" should read --pass,--.

Column 4, line 7, "ginen" should read --given--.

Column 4, line 20, "sequestering" second occurrence, should read --sequestered--.

Column 4, line 32, "Baumé" should read --Baume--.

Column 4, line 39, "call" should read --fall--.

Column 4, line 44, "2.2%" should read --2.2%:--.

Column 5, line 1, "the" should read --The--.

Column 5, line 39, "bulb" should read --bulk--.

Column 6, line 16, "one" should read --once--.

FORM PO-1050 (10-69)

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,682,588          Dated August 8, 1972

Inventor(s) Robert J. Fuchs and Raimond Pals

It is certified that error appears in the above-identified patent and that said Letters Patent are hereby corrected as shown below:

Column 6, line 53, after "...the spirit of the invention.", the following sentence was left out --The "Abstract" given above is merely for the convenience of searchers and is not to be given any weight in defining the scope of the invention.--.

Column 6, line 58, "radian" should read --radiant--.

Column 6, line 68, "occurs" should read --occurs,--.

Signed and sealed this 17th day of September 1974.

(SEAL)
Attest:

McCOY M. GIBSON JR.          C. MARSHALL DANN
Attesting Officer            Commissioner of Patents